United States Patent
Nakamura et al.

(10) Patent No.: US 9,417,364 B2
(45) Date of Patent: Aug. 16, 2016

(54) LIGHT-DIFFUSING ELEMENT AND POLARIZING PLATE PROVIDED THEREWITH

(75) Inventors: Kozo Nakamura, Ibaraki (JP); Akinori Nishimura, Ibaraki (JP); Hiroyuki Takemoto, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 331 days.

(21) Appl. No.: 13/822,961

(22) PCT Filed: Sep. 16, 2011

(86) PCT No.: PCT/JP2011/071233
§ 371 (c)(1),
(2), (4) Date: May 24, 2013

(87) PCT Pub. No.: WO2012/036274
PCT Pub. Date: Mar. 22, 2012

(65) Prior Publication Data
US 2013/0301130 A1    Nov. 14, 2013

(30) Foreign Application Priority Data

Sep. 17, 2010  (JP) ................. 2010-210131

(51) Int. Cl.
*G02B 5/02*    (2006.01)
*G02B 5/30*    (2006.01)
(Continued)

(52) U.S. Cl.
CPC ............... *G02B 5/02* (2013.01); *G02B 5/0226* (2013.01); *G02B 5/0294* (2013.01); *G02B 5/30* (2013.01);
(Continued)

(58) Field of Classification Search
CPC ...... G02B 5/02; G02B 5/0226; G02B 5/0263; G02B 5/0278; G02B 5/0284; G02B 6/0051; G02B 5/30; G02B 5/3008; G02F 1/133502; G02F 1/133504
USPC ........ 359/599, 493.01, 494.01; 428/323, 325, 428/326, 327; 349/112
See application file for complete search history.

(56) References Cited

U.S. PATENT DOCUMENTS

| | | |
|---|---|---|
| 6,416,910 B1 | 7/2002 | Iimura et al. |
| 6,771,336 B2 | 8/2004 | Tatsuta et al. |

(Continued)

FOREIGN PATENT DOCUMENTS

| | | |
|---|---|---|
| JP | 6-347617 A | 12/1994 |
| JP | 3071538 B2 | 7/2000 |

(Continued)

OTHER PUBLICATIONS

English Translation of the Taiwan's patent document No. TW200730886.*

(Continued)

*Primary Examiner* — Bumsuk Won
*Assistant Examiner* — Ephrem Mebrahtu
(74) *Attorney, Agent, or Firm* — Westerman, Hattori, Daniels & Adrian, LLP

(57) ABSTRACT

There is provided a light diffusing element of a thin film, which has high light diffusibility and a small depolarization factor. A light diffusing element according to an embodiment of the present invention includes: a first region having a first refractive index; a refractive index modulation region having a substantially spherical shell shape, which surrounds the first region; and a second region having a second refractive index, which is positioned on a side of the refractive index modulation region opposite to the first region. The light diffusing element has a haze of 90% to 99.9% and a depolarization factor of 0.2% or less.

24 Claims, 10 Drawing Sheets

(51) Int. Cl.
  *G02F 1/1335* (2006.01)
  *G02B 1/10* (2015.01)
(52) U.S. Cl.
  CPC ........ *G02B 5/3025* (2013.01); *G02F 1/133504* (2013.01); *G02F 1/133606* (2013.01); *G02B 1/105* (2013.01)

(56) References Cited

U.S. PATENT DOCUMENTS

| | | | |
|---|---|---|---|
| 7,997,743 | B2 | 8/2011 | Suzuki et al. |
| 8,405,794 | B2 | 3/2013 | Fuchida et al. |
| 2002/0135714 | A1 | 9/2002 | Tatsuta et al. |
| 2003/0067571 | A1* | 4/2003 | Lowe .................... 349/115 |
| 2006/0227695 | A1 | 10/2006 | Nagaoka |
| 2009/0051278 | A1 | 2/2009 | Saneto et al. |
| 2010/0039708 | A1 | 2/2010 | Suzuki et al. |
| 2010/0283940 | A1 | 11/2010 | Takemoto et al. |
| 2011/0317099 | A1 | 12/2011 | Fuchida et al. |

FOREIGN PATENT DOCUMENTS

| | | | |
|---|---|---|---|
| JP | 2001-133607 A | | 5/2001 |
| JP | 2002-196114 A | | 7/2002 |
| JP | 2002-214408 A | | 7/2002 |
| JP | 2005-004163 A | | 1/2005 |
| JP | 2009-70814 A | | 4/2009 |
| JP | 2009-244383 A | | 10/2009 |
| JP | 2010-15038 A | | 1/2010 |
| KR | 10-2009-0019753 A | | 2/2009 |
| KR | 10-2009-0039475 A | | 4/2009 |
| TW | 200707012 A | | 2/2007 |
| TW | 200730886 | * | 8/2007 |
| TW | 200730886 A | | 8/2007 |
| TW | 201011356 A1 | | 3/2010 |
| TW | 201038979 A1 | | 11/2010 |
| WO | 2006/124588 A1 | | 11/2006 |

OTHER PUBLICATIONS

International Search Report for PCT/JP2011/071233, mailing date of Nov. 8, 2011.
Machine translation of JP3071538, previously filed on Mar. 13, 2013.
Machine translation of JP2002-196114, previously filed on Mar. 13, 2013.
Machine translation of JP2009-244383, previously filed on Mar. 13, 2013.
Machine translation of JP06-347617, previously filed on Mar. 13, 2013.
Korean Office Action dated May 23, 2014, issued in corresponding Korean Patent Application No. 10-2013-7006719, w/English translation (18 pages).
Office Action dated Apr. 2, 2014, issued in Taiwanese Patent Application No. 100133616, with English Translation (11 pages).
Office Action dated Nov. 5, 2015, issued in counterpart Korean Application No. 2013-7006719, with English translation (19 pages).
Office Action dated Jan. 6, 2016, issued in counterpart Japanese application No. 2011-202288, with English Translation (8 pages).

* cited by examiner

LIGHT-DIFFUSING ELEMENT AND POLARIZING PLATE PROVIDED THEREWITH

TECHNICAL FIELD

The present invention relates to a light diffusing element and a polarizing plate with the light diffusing element.

BACKGROUND ART

A light diffusing element is widely used in illumination covers, screens for projection televisions, surface-emitting devices (for example, liquid crystal display devices), and the like. In recent years, the light diffusing element has been used for enhancing display quality of liquid crystal display devices and the like and for improving viewing angle properties, for example. As the light diffusing element, for example, there is proposed a light diffusing element in which fine particles are dispersed in a matrix such as a resin sheet (see, for example, Patent Literature 1). In such light diffusing element, most of incident light scatters forward (output plane side), whereas a part thereof scatters backward (incident plane side). As a result, there arise problems in that an amount of transmitted light becomes small, and a display screen has an insufficient contrast.

Further, along with the widespread use of the liquid crystal display device, applications of the light diffusing element are increasing, such as placing a light diffusing element on a forefront surface of a liquid crystal display device so as to enhance display quality of the liquid crystal display device, and using a light diffusing element in a reflection type liquid crystal display device. In such utilization forms, the light diffusing element may be placed on an inner side (liquid crystal cell side in the case of application to a liquid crystal display device) of a polarizer. However, the light diffusing element as described in Patent Literature 1 has large depolarization, and hence cannot be substantially utilized in such fields. Further, there is an attempt to combine polarized glasses with a liquid crystal display device to achieve a three-dimensional (3D) display. In this case, if a light diffusing element is applied to a polarizing plate on a viewer side so as to enhance display quality of the liquid crystal display device, the light diffusing element as described in Patent Literature 1 has large depolarization, and hence a polarization shutter function does not work completely with the polarized glasses to cause crosstalk (phenomenon in which a video to be originally recognized by only the right eye can also be recognized by the left eye, or a video to be originally recognized by only the left eye can also be recognized by the right eye). Thus, the light diffusing element cannot be utilized practically.

As means for suppressing the depolarization as described above, there has been proposed a light diffusing material obtained by self-fusing so-called gradient index (GRIN) fine particles, in which a refractive index changes continuously from a center portion of each of the fine particles toward its outside (see, for example, Patent Literature 2). However, in the light diffusing material of Patent Literature 2 obtained by self-fusing the GRIN fine particles, a film is liable to become uneven during fusion to make it difficult to form a uniform surface, resulting in insufficient optical uniformity. In addition, according to the technology of Patent Literature 2, gaps between the particles remain during fusion to form bubbles in many cases, and backscattering due to the bubbles becomes very large. Thus, a degassing step for removing the bubbles is required.

CITATION LIST

Patent Literature

[PTL 1] JP 3071538 B2
[PTL 2] JP 2002-214408 A

SUMMARY OF INVENTION

Technical Problem

The present invention has been made to solve the above-mentioned conventional problems, and an object of the present invention is to provide a light diffusing element of a thin film, which has high light diffusibility and a small depolarization factor.

Solution to Problem

A light diffusing element according to an embodiment of the present invention includes: a first region having a first refractive index; a refractive index modulation region having a substantially spherical shell shape, which surrounds the first region; and a second region having a second refractive index, which is positioned on a side of the refractive index modulation region opposite to the first region. The light diffusing element has a haze of 90% to 99.9% and a depolarization factor of 0.2% or less.

In one embodiment of the present invention, the light diffusing element includes: a matrix containing an inorganic ultrafine particle component and a resin component; and amorphous light diffusing fine particles dispersed in the matrix. The refractive index modulation region is formed in a vicinity of an interface between the matrix and the amorphous light diffusing fine particle by a substantial gradient of a dispersion concentration of the inorganic ultrafine particle component in the matrix.

In one embodiment of the present invention, the matrix contains the inorganic ultrafine particle component in an amount of 40% by weight or more.

In one embodiment of the present invention, the inorganic ultrafine particle component has an average primary particle diameter of 100 nm or less.

In one embodiment of the present invention, the light diffusing element has a light diffusion half-value angle of 10° to 90°.

In one embodiment of the present invention, the light diffusing element has a backscattering ratio of 1% or less.

In one embodiment of the present invention, the light diffusing element has an in-plane retardation Re of 5 nm or less.

In one embodiment of the present invention, a ratio $T/d_P$ between a thickness T of the light diffusing element and an average particle diameter $d_P$ of the light diffusing fine particles is 10 or less.

According to another aspect of the present invention, a polarizing plate with a light diffusing element is provided. The polarizing plate with a light diffusing element includes: the above-mentioned light diffusing element; and a polarizer.

Advantageous Effects of Invention

According to the present invention, it is possible to realize the light diffusing element of a thin film, which has high light diffusibility and a small depolarization factor. Specifically, it is possible to realize the light diffusing element having a haze of 90% or more and a depolarization factor of 0.2% or less.

DESCRIPTION OF EMBODIMENTS

Figure 1A:
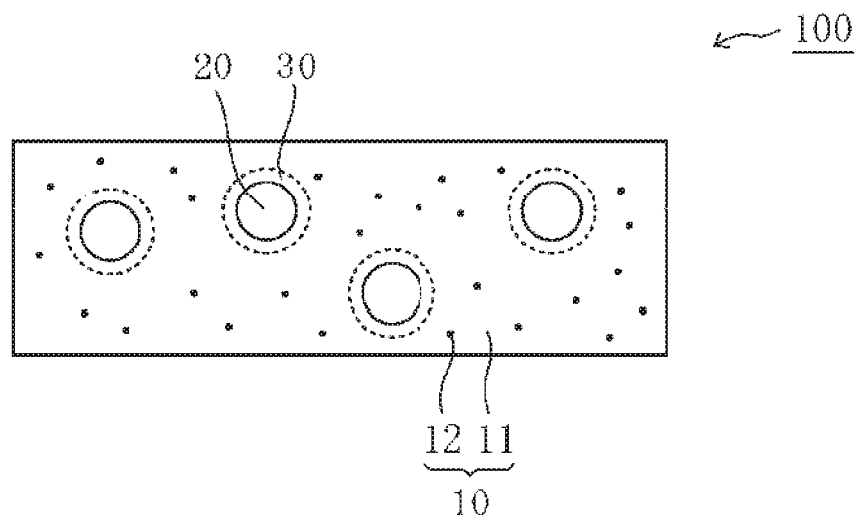
FIG. 1A is a schematic cross-sectional view of a light diffusing element according to a preferred embodiment of the present invention.

Hereinafter, preferred embodiments of the present invention are described with reference to the drawings. However, the present invention is not limited to these specific embodiments.

A. Light Diffusing Film

A-1. Entire Construction

A light diffusing film according to an embodiment of the present invention has a first region having a first refractive index and a second region having a second refractive index. The light diffusing film of the present embodiment expresses a light diffusing function on the basis of a difference in refractive index between the first region and the second region. In the present invention, the first region is surrounded by a substantially spherical shell-shaped refractive index modulation region, and the second region is formed so as to be positioned on the side of the refractive index modulation region opposite to the first region. Therefore, in the light diffusing film of the present embodiment, the first region surrounded by the refractive index modulation region is seemingly in a state of being dispersed in the second region. In the refractive index modulation region, a refractive index changes in a substantially continuous manner. The phrase "refractive index changes in a substantially continuous manner" as used herein means that the refractive index has only to change in a substantially continuous manner in the refractive index modulation region. Therefore, even when a refractive index gap within a predetermined range (e.g., a refractive index difference of 0.05 or less) is present at, for example, an interface between the first region and the refractive index modulation region and/or an interface between the refractive index modulation region and the second region, the gap is acceptable.

The light diffusion property of the light diffusing element of the present embodiment is typically expressed by a haze and a light diffusion half-value angle. The haze indicates intensity of light diffusion, that is, a diffusion degree of incident light. On the other hand, the light diffusion half-value angle indicates quality of diffusion light, that is, an angle range of light to be diffused. The light diffusing element of the present embodiment exhibits its effects sufficiently when the haze is high. The haze of the light diffusing element is preferably 90% to 99.9%, more preferably 92% to 99.9%, still more preferably 95% to 99.9%, particularly preferably 97% to 99.9%. When the haze is 90% or more, the light diffusing element can be suitably used as a front light diffusing element in a collimated backlight front diffusing system. According to an embodiment of the present invention, a light diffusing element which has a very high haze and in which backscattering is suppressed as described above can be obtained. It should be noted that the collimated backlight front diffusing system refers to a system in which a front light diffusing element is provided on a viewer side of an upper polarizing plate, using collimated backlight (backlight with a narrow brightness half-width (e.g., 3° to 35° or ±1.5° to ±17.5°) condensed in a predetermined direction) in a liquid crystal display device. The haze can be determined in accordance with JIS 7136. The light diffusion half-value angle will be described later.

The light diffusing element of the present embodiment has a depolarization factor of 0.2% or less, preferably 0.15% or less, more preferably 0.1% or less. The lower limit of the depolarization factor is preferably 0.01%. When the depolarization factor is 0.2% or less, in the case where the light diffusing element is applied to, for example, a 3D liquid crystal display device, crosstalk can be suppressed satisfactorily, and in the case where the light diffusing element is applied to, for example, a reflection type liquid crystal display device, degradation in image quality can be suppressed satisfactorily. One of the outcomes of the present invention is that such a very small depolarization factor is realized while such characteristics of a high haze and low backscattering as described later are maintained. The depolarization factor can be determined from the following expression (1):

$$\text{Depolarization factor } X (\%) = \{(1/CR1) - (1/CR2)\} \times 100 \quad (1)$$

where CR1 represents a polarization contrast in the case where the light diffusing element is sandwiched between two polarizing plates, and CR2 represents a general polarization contrast (of only two polarizing plates). The polarization contrast CR1 can be determined as described below. A light diffusing element is sandwiched between two identical polarizing plates, and the polarizing plates are placed so that the absorption axes are perpendicular to each other with the light diffusing element sandwiched therebetween. The light diffusing element is rotated while the laminated polarizing plates are irradiated with white collimated light from normal direction, the light diffusing element is fixed at an angle where an amount of transmitted light is smallest, and front brightness is measured (orthogonal transmitted light brightness $L_C$). On the other hand, a positional relationship of the polarizing plates is changed so that the absorption axes are parallel to each other, and front brightness is measured (parallel transmitted light brightness $L_P$). CR1 is obtained as $L_P/L_C$. The polarization contrast CR2 is obtained as $L_P/L_C$ from $L_C$ and $L_P$ measured only with the two polarizing plates.

The first region, the second region, and the refractive index modulation region can be formed by any suitable means. Examples thereof include the following means: (1) dispersing, in a resin, refractive index gradient fine particles such as so-called GRIN fine particles the refractive index of which changes continuously from the center portion of the fine particles to an outer side, and using a refractive index gradient portion as a refractive index modulation region; and (2) forming a refractive index modulation region at an interface between a matrix and each of light diffusion fine particles or in the vicinity thereof by a substantial gradient of dispersion concentration of an ultrafine particle component through use of a resin component and the ultrafine particle component in the matrix. Hereinafter, an embodiment in which a resin component and an ultrafine particle component are used in a matrix is mainly described, and only a characteristic portion of an embodiment in which a refractive index gradient fine particle is used is briefly described.

In one embodiment, the light diffusing element of the present invention includes a matrix and amorphous light diffusing fine particles dispersed in the matrix, and expresses a light diffusing function on the basis of a refractive index difference between the matrix and each of the amorphous light diffusing fine particles. In this embodiment, the light diffusing fine particles correspond to the first region, and the matrix corresponds to the second region. The matrix preferably contains a resin component and an inorganic ultrafine particle component. In this embodiment, the amorphous light diffusing fine particles are composed of an amorphous material as the name indicates. When the light diffusing fine particles are composed of an amorphous material, adverse effects due to birefringence or the like can be eliminated. The details of the amorphous light diffusing fine particles are described in the section A-3 described later. It should be noted that, in this description, the "amorphous light diffusing fine particles" are hereinafter simply referred to as "light diffusing fine particles."

In this embodiment, the matrix contains the inorganic ultrafine particle component in an amount of preferably 40% by weight or more, more preferably 40% by weight to 70% by weight. One of the features according to this embodiment lies in that the matrix contains the inorganic ultrafine particle component at such a high concentration. More specifically, the inorganic ultrafine particle component has a very small ratio of dimensional change, and hence the shrinkage of a resin component during a formation of the matrix is reduced with such content of the inorganic ultrafine particle component. For example, in the case of using an ionizing radiation-curable resin as the resin components, for example, curing shrinkage can be reduced to less than 10%. When the curing shrinkage of the matrix is small, shrinkage stress to the light diffusing fine particles can be reduced, and hence retardation at an interface between the matrix and the light diffusing fine particles due to distortion caused by shrinkage becomes small. As a result, a change in polarized state of incident light caused by the retardation is suppressed, and hence a depolarization factor can be reduced. Further, in this embodiment, the inorganic ultrafine particle component is formed of an inorganic material as the name indicates. The inorganic material absorbs less light and has a refractive index which is hardly expressed by the resin component of the matrix and the light diffusing fine particles (organic compound), and hence, as the entire matrix, a refractive index difference with respect to the light diffusing fine particles can be increased. As a result, a high haze can be realized irrespective of a thin film. Further, a difference in compatibility from the resin component and the light diffusing fine particles is increased through use of the inorganic material, and hence a refractive index modulation region (described later) can be formed in the vicinity of an interface between the matrix and each of the light diffusing fine particles. As a result, backscattering can be prevented, and depolarization can be reduced. It should be noted that, in this description, the "inorganic ultrafine particle component" is hereinafter simply referred to as "ultrafine particle component".

The average primary particle diameter of the ultrafine particle component is preferably 100 nm or less, more preferably 75 nm or less, still more preferably 50 nm or less. The lower limit of the average primary particle diameter of the ultrafine particle component is preferably 5 nm. In the case of using ultrafine particle component having an average particle diameter sufficiently smaller than a light wavelength, geometric optical reflection, refraction, and scattering do not occur between the ultrafine particle component and the resin component. Further, as the particle diameter becomes smaller, the influence of birefringence of the particle becomes smaller, and retardation is less likely to occur. Hence, depolarization can be suppressed. Further, an optically uniform matrix can be obtained. As a result, an optically uniform light diffusing element can be obtained. In addition, the ultrafine particle component of 100 nm or less serves to alleviate alignment of a surrounding polymer satisfactorily. Therefore, when a polymer is used as a matrix, the occurrence of retardation (in-plane retardation, thickness direction retardation) caused by stress during polymer film formation (during matrix formation) can be suppressed. As a result, depolarization caused by retardation can be suppressed. The details of the ultrafine particle component are described in the section A-2-2 described later.

In the light diffusing element according to this embodiment, it is preferred that a refractive index modulation region be formed in the vicinity of an interface between the matrix and each of the light diffusing fine particles. Thus, the matrix includes a refractive index modulation region in the vicinity of an interface between the matrix and each of the light diffusing fine particles and a refractive index constant region on the outside (side away from the light diffusing fine particles) of the refractive index modulation region. It is preferred that a portion of the matrix other than the refractive index modulation region substantially serve as a refractive index constant region. The term "vicinity of an interface between a matrix and each of light diffusing fine particles" as used herein comprehends the surface of each of the light diffusing fine particles, an external portion in the vicinity of the surface, and an inner portion in the vicinity of the surface. In the refractive index modulation region, the refractive index changes substantially continuously. Through the formation of a refractive index modulation region a refractive index of which changes substantially continuously, backscattering can be suppressed to suppress depolarization, and moreover, by virtue of the synergistic effects of materials for forming the light diffusing fine particles and the ultrafine particle component and the concentration of the ultrafine particle component, the depolarization factor can be reduced to a very small value. The phrase "refractive index changes substantially continuously" as used herein means that the refractive index only needs to change substantially continuously at least from the surface of each of the light diffusing fine particles to the refractive index constant region in the refractive index modulation region. Thus, for example, even when a refractive index gap in a predetermined range (for example, a refractive index difference of 0.05 or less) is present at an interface between each of the light diffusing fine particles and the refractive index modulation region and/or an interface between the refractive index modulation region and the refractive index constant region, the gap is permissible. It should be noted that a relationship between the backscattering and the depolarization is described later.

Figure 1B:
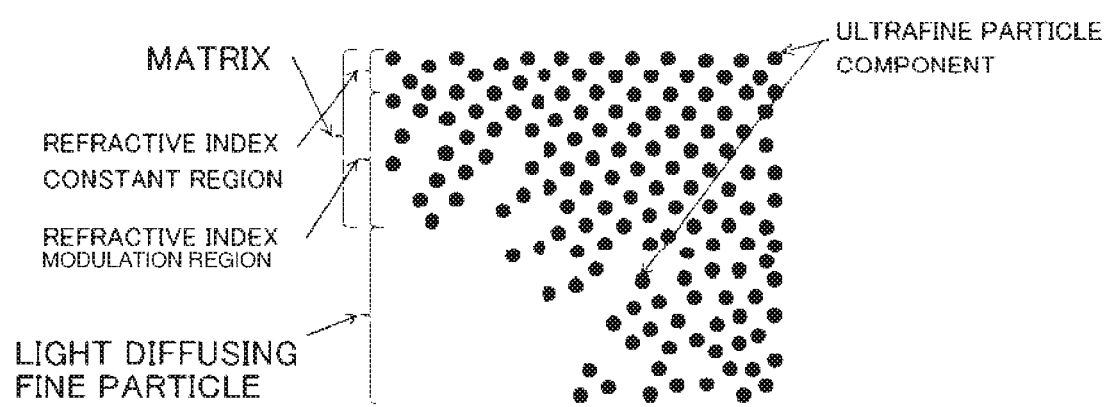
FIG. 1B is an enlarged schematic view illustrating the vicinity of an amorphous light diffusing fine particle in the light diffusing element of FIG. 1A.

FIG. 1A is a schematic cross-sectional view of the light diffusing element according to this embodiment, and FIG. 1B is an enlarged schematic view illustrating the vicinity of the light diffusing fine particle in the light diffusing element of FIG. 1A. As described above, the matrix includes a resin component and an ultrafine particle component. A light diffusing element 100 of FIG. 1A includes a matrix 10 including a resin component 11 and an ultrafine particle component 12, and light diffusing fine particles 20 dispersed in the matrix 10. In FIG. 1A, a refractive index modulation region 30 is formed in an external portion in the vicinity of the surface of each of the light diffusing fine particles 20. In the refractive index modulation region 30, the refractive index changes substantially continuously as described above.

It is preferred that the light diffusing element 100 satisfy the following expressions (2) and (3):

$$\Delta n \geq 0.08 \quad (2)$$

$$0.0006 \leq \Delta n/L \quad (3)$$

where $\Delta n$ represents an absolute value $|n_M-n_P|$ of a difference between an average refractive index $n_M$ of the matrix and a refractive index $n_P$ of the light diffusing fine particle, and L represents an average thickness of the refractive index modulation region. The average refractive index $n_M$ of the matrix is a weighted average of a refractive index of the resin component and a refractive index of the ultrafine particle component. $\Delta n$ preferably represents 0.10 or more. The upper limit of $\Delta n$ preferably represents 0.20. When $\Delta n$ represents less than 0.10, a haze is 90% or less in many cases. As a result, when the light diffusing element is incorporated into a liquid crystal display device, light from a light source cannot be diffused sufficiently, and there is a risk in that a viewing angle may become small. When $\Delta n$ represents more than 0.20, there is a risk in that backscattering may increase, with the result that depolarization cannot be prevented. Further, the selection of the resin component and the ultrafine particle component of the matrix may become difficult. Further, it is preferred that a relationship of $n_M>n_P$ be satisfied. $\Delta n/L(nm^{-1})$ preferably represents 0.00075 to 0.01. The average thickness L of the refractive index modulation region capable of realizing such $\Delta n/L$ is preferably 5 nm to 500 nm, more preferably 12 nm to 400 nm, still more preferably 15 nm to 300 nm. When the average thickness L is less than 5 nm, backscattering may increase. When the average thickness L is more than 500 nm, diffusibility may become insufficient. Thus, in the light diffusing element according to this embodiment, a refractive index modulation region having large $\Delta n$ (that is, remarkably large $\Delta n/L$) in spite of the fact that the average thickness L of the refractive index modulation region is very small can be formed. Further, as described above, in the light diffusing element according to this embodiment, the refractive index can be changed substantially continuously in the refractive index modulation region. By virtue of the synergistic functions, according to this embodiment, the light diffusing element of a thin film can be realized, which has high light diffusibility, suppressed backscattering, and a small depolarization factor.

Figure 2:
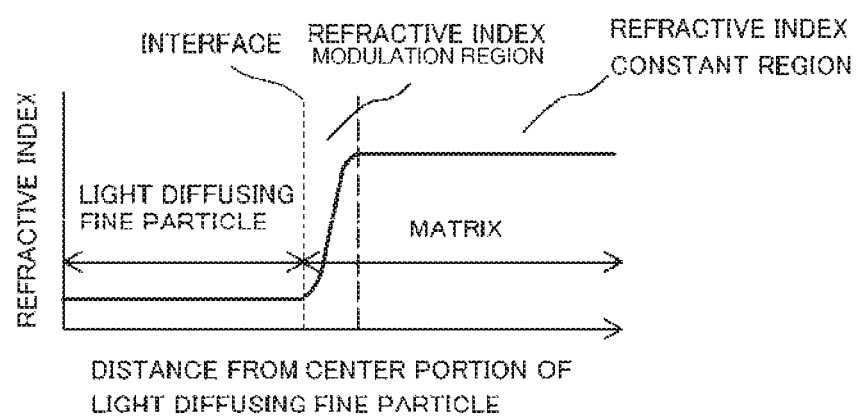
FIG. 2 is a conceptual diagram for illustrating a change in refractive index from a center portion of the amorphous light diffusing fine particle to a matrix in the light diffusing element of FIG. 1A.

As described above, in the refractive index modulation region 30, the refractive index changes substantially continuously. It is preferred that, in addition to the foregoing, a refractive index in an outermost portion of the refractive index modulation region and a refractive index of the refractive index constant region be substantially identical. In other words, in the light diffusing element of the present embodiment, the refractive index changes continuously from the refractive index modulation region to the refractive index constant region, and preferably, the refractive index changes continuously from the light diffusing fine particle to the refractive index constant region (FIG. 2). It is preferred that the change in refractive index be smooth as illustrated in FIG. 2. That is, the refractive index changes in such a shape that a tangent can be drawn on a refractive index change curve in a boundary between the refractive index modulation region and the refractive index constant region. It is preferred that, in the refractive index modulation region, the gradient of the change in refractive index increases with increasing distance from the light diffusing fine particle. In the light diffusing element according to this embodiment, a substantially continuous change in refractive index can be realized by appropriately selecting materials for forming the light diffusing fine particles and the ultrafine particle component, and the concentration of the ultrafine particle component in the matrix, and appropriately selecting a resin component of the matrix as described above. One of the features of the present invention lies in that the change in refractive index, which is steep as described above ($\Delta n/L$ is very large) and which is substantially continuous, is realized. As a result, even when a refractive index difference between the matrix 10 (substantially, the refractive index constant region) and each of the light diffusing fine particles 20 is increased, reflection from an interface between the matrix 10 and each of the light diffusing fine particles 20 can be suppressed. As a result, backscattering can be suppressed and a depolarization factor can be reduced. Further, in the refractive index constant region, the weight concentration of the ultrafine particle component 12 the refractive index of which is largely different from that of each of the light diffusing fine particles 20 is relatively high, and hence the refractive index difference between the matrix 10 (substantially, the refractive index constant region) and each of the light diffusing fine particles 20 can be increased. As a result, a high haze (high light diffusibility) can be realized irrespective of a thin film. Thus, in the light diffusing element according to this embodiment, backscattering can be suppressed remarkably and a depolarization factor can be reduced while a difference in refractive index is increased to realize a high haze. On the other hand, in a conventional light diffusing element in which no refractive index modulation region is formed, if an attempt is made to increase a difference in refractive index to impart high light diffusibility (high haze value), a gap of a refractive index at an interface cannot be eliminated. As a result, backscattering caused by reflection from an interface between the light diffusing fine particle and the matrix increases, with the result that a black display may not become sufficiently black in the presence of ambient light (that is, a black color may get out of harmony) in many cases. Further, there arises a problem of depolarization due to the reflection from an interface between the light diffusing fine particle and the matrix in many cases. In the light diffusing element according to this embodiment, through the formation of a refractive index modulation region having very large Δn/L and in which a refractive index changes substantially continuously, the problems of the related art are solved, and the light diffusing element having high light diffusibility, suppressed backscattering, and a small depolarization factor can be obtained.

Preferably, the light diffusing element 100 satisfies the expression (4):

$$0.01 \leq L/r_P \leq 0.2 \quad (4)$$

where $r_P$ represents the radius (nm) of the light diffusing fine particle. $L/r_P$ is more preferably 0.02 to 0.15. In the light diffusing element according to this embodiment, the average thickness L of the refractive index modulation region can be set to be very small as described above, and hence, $L/r_P$ can be set to be very small. As a result, backscattering can be suppressed satisfactorily while scattering ability of each of the light diffusing fine particles is kept sufficiently. Thus, a high haze (strong diffusibility) can be realized in spite of a thin film. Further, backscattering can be suppressed, and consequently, depolarization factor can be reduced.

The thickness of the refractive index modulation region 30 (distance from the innermost portion of the refractive index modulation region to the outermost portion of the refractive index modulation region) may be constant (that is, the refractive index modulation region may spread to the circumference of the light diffusing fine particle in a concentric sphere shape), or the thickness may vary depending upon the position of the surface of the light diffusing fine particle (for example, the refractive index modulation region may have a contour shape of a candy called confetti). Preferably, the thickness of the refractive index modulation region 30 varies depending upon the position of the surface of the light diffusing fine particle. With such construction, the refractive index can be changed more smoothly and continuously in the refractive index modulation region. The average thickness L is an average thickness in the case where the thickness of the refractive index modulation region 30 varies depending upon the position of the surface of the light diffusing fine particle, and in the case where the thickness is constant, the constant thickness is the average thickness L.

Figure 3:
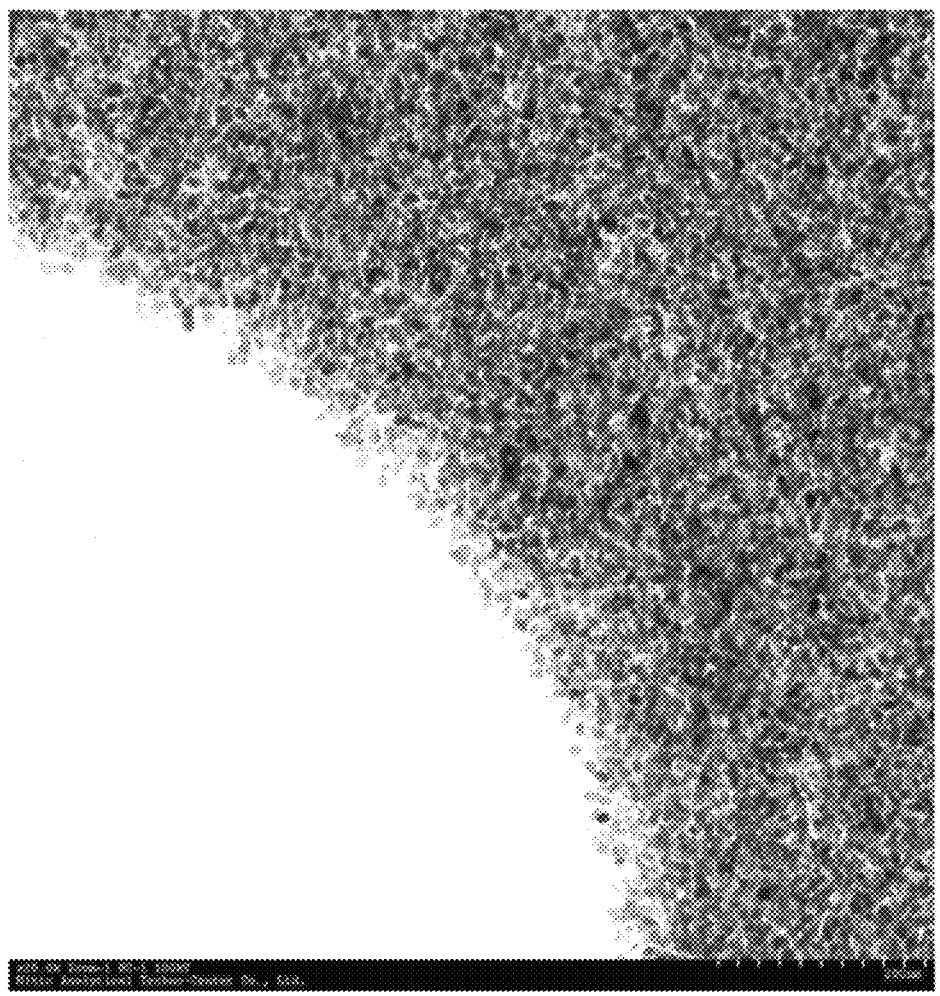
FIG. 3 is a transmission electron microscope image for showing an area ratio of an inorganic ultrafine particle component in the matrix.

As described above, the matrix 10 preferably includes the resin component 11 and the ultrafine particle component 12. The ultrafine particle component 12 is dispersed in the matrix 10 (substantially, the resin component 11). Preferably, the refractive index modulation region 30 is formed by a substantial gradient of dispersion concentration of the ultrafine particle component 12 in the matrix 10. Specifically, in the refractive index modulation region 30, the dispersion concentration (typically, defined in terms of weight concentration) of the ultrafine particle component 12 increases (inevitably, the weight concentration of the resin component 11 decreases) with increasing distance from the light diffusing fine particle 20. In other words, in a region of the refractive index modulation region 30 closest to the light diffusing fine particle 20, the ultrafine particle component 12 is dispersed at a relatively low concentration, and the concentration of the ultrafine particle component 12 increases with increasing distance from the light diffusing fine particle 20. For example, an area ratio of the ultrafine particle component 12 in the matrix 10 according to a transmission electron microscope (TEM) image is small on a side close to the light diffusing fine particle 20 and large on a side close to the matrix 10. Thus, the area ratio varies while forming a substantial gradient from the light diffusing fine particle side to the matrix side (refractive index constant region side). FIG. 3 shows a TEM image showing its typical dispersion state. The phrase "area ratio of an ultrafine particle component in a matrix according to a transmission electron microscope image" as used herein refers to a ratio of the area of the ultrafine particle component occupying the matrix in a predetermined range (predetermined area) in a transmission electron microscope image of a cross-section including the diameter of the light diffusing fine particle. The area ratio corresponds to the three-dimensional dispersion concentration (actual dispersion concentration) of the ultrafine particle component. For example, with the above-mentioned area ratio, the gradient of a change in the dispersion concentration of the ultrafine particle component 12 is small on a side close to the light diffusing fine particle 20 and large on a side close to the refractive index constant region. Thus, the dispersion concentration of the ultrafine particle component 12 changes while forming a substantial gradient from the light diffusing fine particle side to the refractive index constant region side. In other words, the gradient of the change in the dispersion concentration of the ultrafine particle component 12 increases with increasing distance from the light diffusing fine particle. The area ratio of the ultrafine particle component can be determined by any suitable image analysis software. In the light diffusing element according to this embodiment, the refractive index modulation region 30 can be formed in the vicinity of an interface between the matrix and the light diffusing fine particle through use of a substantial gradient of dispersion concentration of the ultrafine particle component 12, and hence, the light diffusing element can be produced by a simple procedure at low cost. Further, by forming the refractive index modulation region through use of a substantial gradient of dispersion concentration of the ultrafine particle component, the refractive index is allowed to change smoothly in a boundary between the refractive index modulation region 30 and the refractive index constant region. Further, the refractive index difference between the light diffusing fine particle and the matrix (substantially, the refractive index constant region) can be increased, and the refractive index gradient of the refractive index modulation region can be made steep through use of the ultrafine particle component the refractive index of which is largely different from those of the resin component and the light diffusing fine particle.

The refractive index modulation region (substantially, the substantial gradient of the dispersion concentration of the ultrafine particle component as described above) can be formed by appropriately selecting materials for forming the resin component and the ultrafine particle component of the matrix, and the light diffusing fine particles, and chemical and thermodynamic properties thereof. That is, the refractive index modulation region can be formed satisfactorily by forming the resin component and the light diffusing fine particles through use of organic compounds, forming the light diffusing fine particles through use of an amorphous material, and forming the ultrafine particle component through use of an inorganic compound. Further, it is preferred that the resin component and the light diffusing fine particles be formed of materials having high compatibility with each other. The thickness and refractive index gradient of the refractive index modulation region can be controlled by adjusting the chemical and thermodynamic properties of the resin component and the ultrafine particle component of the matrix, and the light diffusing fine particles. In the light diffusing element according to this embodiment, the electric repulsion between the ultrafine particles is increased by increasing the dispersion concentration of the ultrafine particle component in the matrix. As a result, the ultrafine particle component is present also in the vicinity of the light diffusing fine particle, and a steep refractive index gradient can be formed in the refractive index modulation region (the thickness of the refractive index modulation region becomes small).

Figure 4:
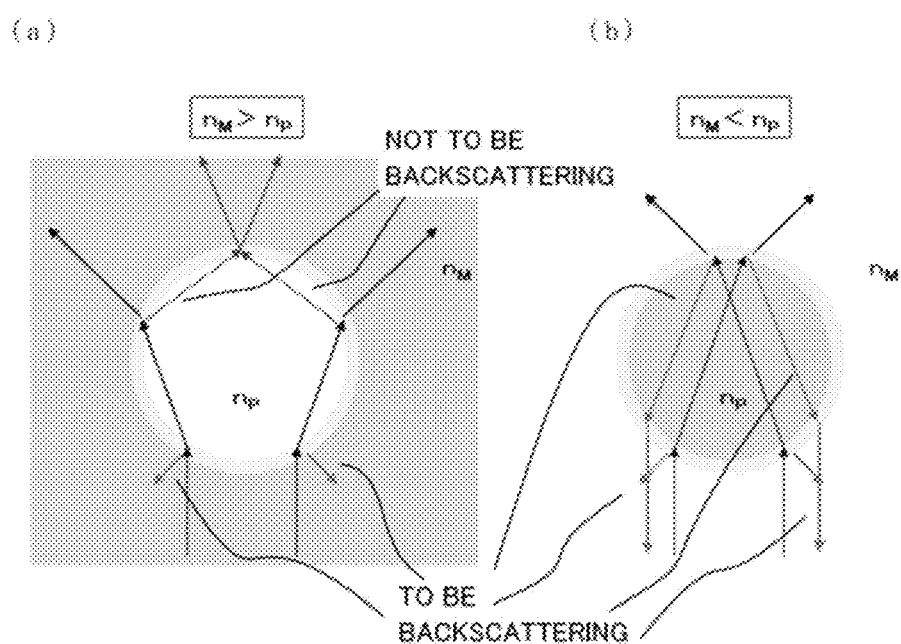
FIG. 4(a) is a conceptual diagram for illustrating a mechanism for the occurrence of backscattering in the case where the relationship of "average refractive index $n_M$ of matrix>refractive index $n_P$ of amorphous light diffusing fine particle" is satisfied.
FIG. 4(b) is a conceptual diagram for illustrating a mechanism for the occurrence of backscattering in the case where $n_M < n_P$.

In the light diffusing element 100 according to this embodiment, it is preferred that the relationship of $n_M > n_P$ be satisfied. As illustrated in the comparison between FIGS. 4(a) and 4(b), in the case where the relationship of $n_M > n_P$ is satisfied, backscattering can be suppressed more satisfactorily even when the refractive index gradient of the refractive index modulation region is steep, compared with the case where $n_M < n_P$ is satisfied.

The light diffusion property of the light diffusing element is preferably 10° to 150° (5° to 75° on one side), more preferably 10° to 100° (5° to 50° on one side), still more preferably 30° to 80° (15° to 40° on one side) in terms of a light diffusion half-value angle. When the light diffusion half-value angle is too small, an oblique viewing angle (for example, white brightness) may become narrow in some cases. When the light diffusion half-value angle is too large, backscattering may become large in some cases.

Figure 5:
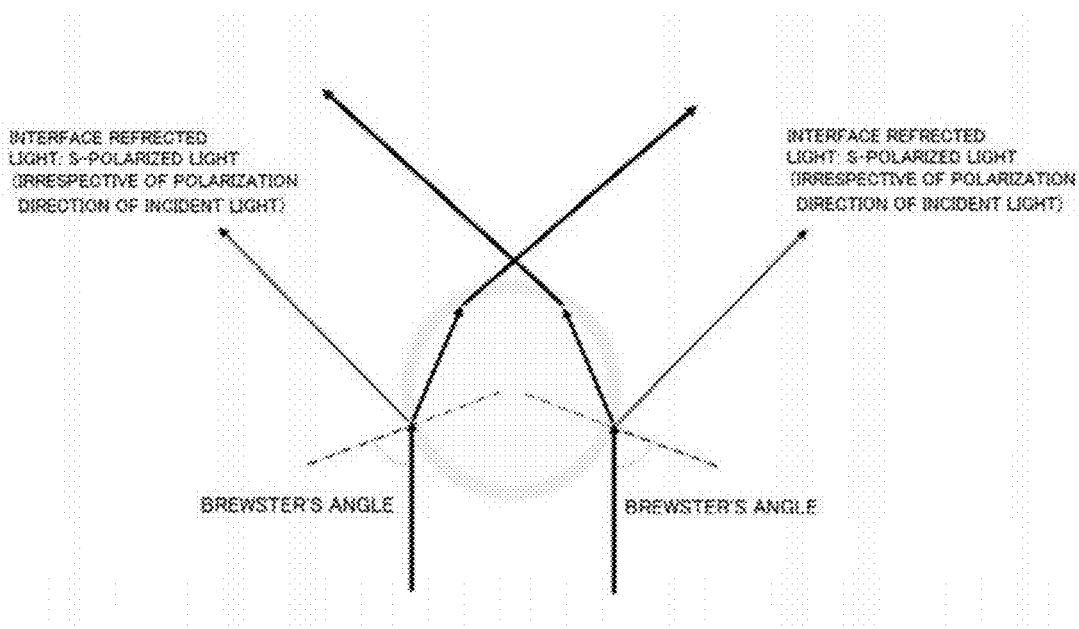
FIG. 5 is a conceptual diagram for illustrating a relationship between backscattering and depolarization.

The backscattering ratio of the light diffusing element is preferably 1% or less, more preferably 0.7% or less, still more preferably 0.5% or less. In the light diffusing element of the present embodiment, the backscattering ratio can be decreased to 1% or less, and hence a depolarization factor can be reduced. The reason why a depolarization factor can be reduced when backscattering is small is briefly described. (1) The traveling direction of incident light greatly changes due to backscattering, and hence polarizing axes of the incident light and scattered light are shifted. Further, when backscattering is large, light scattered backward is further scattered backward, and as a result, the light is scattered forward. The polarization axis of such forward scattered light does not coincide with the polarization axis of the incident light any more. (2) As illustrated in FIG. 5, a light diffusing element having large backscattering has a large refractive index difference at an interface between the light diffusing fine particle and the matrix, and hence reflection from the interface is also large. In this case, light having entered the interface is polarized and separated into an S-polarized light component and a P-polarized light component, and in particular, oblique light is liable to be polarized and separated. Further, of the light having entered the interface, light reflected from the interface contains a large amount of the S-polarized light component with respect to the surface of the light diffusing fine particle. Further, in the case where an incident angle is a Brewster's angle, only the S-polarized light component is reflected. In many cases, the light diffusing fine particles have a spherical surface, and hence have a reflection interface in various directions. Thus, the polarization axis of the light reflected from the interface has various directions, which disturbs the polarization of incident light in accordance with an amount of the reflected light. Regarding the phenomena (1) and (2), according to the present invention, a refractive index can be changed substantially continuously between the light diffusing fine particle and the matrix to reduce interface reflection. Hence, the polarization separation as well as backscattering can be suppressed, and thus depolarization can be reduced.

It is preferred that the in-plane retardation Re of the light diffusing element be as small as possible, and the in-plane retardation is preferably 5 nm or less, more preferably 3 nm or less. When the in-plane retardation Re is small, a change in polarized state can be reduced even when oblique scattered light passes through the light diffusing element, and hence depolarization can be reduced. It should be noted that the in-plane retardation Re represents a retardation value in a film plane measured with light having a wavelength of 590 nm at 23° C. and can be determined by the following equation:

$$Re = (nx - ny) \times d$$

where nx represents a refractive index in a direction in which an in-plane refractive index becomes maximum (that is, a slow axis direction), ny represents a refractive index in a direction perpendicular to the slow axis in a plane, and d represents a thickness (nm) of a film (in this case, a light diffusing element) to be measured.

The thickness of the light diffusing element can be set appropriately depending upon purposes and desired diffusion property. Specifically, the thickness of the light diffusing element is preferably 4 μm to 50 μm, more preferably 4 μm to 20 μm. According to an embodiment of the present invention, a light diffusing element having a very high haze (excellent light diffusibility) as described above in spite of such very small thickness can be obtained. Further, with such small thickness, the light diffusing element is not cracked even when it is bent, and can be stored in a roll shape. In addition, as described later, the light diffusing element of the present embodiment can be formed by application, and hence, for example, the production of the light diffusing element and the attachment thereof to a polarizing plate can be performed continuously through so-called roll-to-roll. Thus, the light diffusing element of the present embodiment is very excellent in productivity of the light diffusing element itself and has very high production efficiency of attachment to other optical members such as a polarizing plate. The roll-to-roll refers to a process of attaching long films to each other continuously with their longitudinal directions being aligned while conveying the films with rolls.

A ratio $T/d_P$ between a thickness T of the light diffusing element and an average particle diameter $d_P$ of the light diffusing fine particle is preferably 10 or less, more preferably 5 or less. When $T/d_P$ is more than 10, multiple scattering increases too much and consequently, a depolarization factor may be increased in many cases. According to the present embodiment, the thickness of the light diffusing element can be rendered very thin, and hence Tide can be reduced. As a result, depolarization can be suppressed while high light diffusibility is maintained by appropriate multiple scattering.

The light diffusing element of the present invention may be provided as a single film or plate member, or may be provided as a composite member in which the light diffusing element is attached to any suitable base material or polarizing plate. Further, a reflection preventing layer may be laminated on the light diffusing element.

A-2. Matrix

As described above, the matrix 10 preferably includes the resin component 11 and the ultrafine particle component 12. As described above and as illustrated in FIGS. 1A and 1B, the ultrafine particle component 12 is dispersed in the resin component 11 so as to form the refractive index modulation region 30 in the vicinity of the interface between the matrix 10 and the light diffusing fine particle 20.

A-2-1. Resin Component

The resin component 11 is formed of any suitable material as long as the refractive index modulation region is formed. Preferably, as described above, the resin component 11 is formed of a compound having equivalent or similar chemical structures and properties to those of the light diffusing fine particle and having non-similar chemical structures and properties to those of the ultrafine particle component. With this, the refractive index modulation region can be formed satisfactorily in the vicinity of the interface between the matrix and each of the light diffusing fine particles (in the vicinity of the surface of each of the light diffusing fine particles). More preferably, the resin component 11 is formed of a compound having high compatibility with each of the light diffusing fine particles. With this, the refractive index modulation region having a desired gradient of the refractive index can be formed.

The resin component is formed of preferably an organic compound, more preferably an ionizing radiation-curable resin. The ionizing radiation-curable resin is excellent in hardness of an applied film, and hence easily compensates for mechanical strength, which is a weak point of the ultrafine particle component described later. Examples of the ionizing radiation include UV light, visible light, infrared light, and an electron beam. Of those, UV light is preferred, and thus, the resin component is particularly preferably formed of a UV-curable resin. Examples of the UV-curable resin include resins formed of radical-polymerizable monomers and/or oligomers such as an acrylate resin (epoxy acrylate, polyester acrylate, acrylic acrylate, or ether acrylate). A monomer component (precursor) that constructs the acrylate resin preferably has a molecular weight of 200 to 700. Specific examples of the monomer component (precursor) that constructs the acrylate resin include pentaerythritol triacrylate (PETA, molecular weight: 298), neopentylglycol diacrylate (NPGDA, molecular weight: 212), dipentaerythritol hexaacrylate (DPHA, molecular weight: 632), dipentaerythritol pentaacrylate (DPPA, molecular weight: 578), and trimethylolpropane triacrylate (TMPTA, molecular weight: 296). If required, an initiator may be added to the precursor. Examples of the initiator include a UV radial generator (e.g., Irgacure 907, 127, or 192 manufactured by BASF Japan Ltd.) and benzoyl peroxide. The resin component may contain another resin component other than the ionizing radiation-curable resin. The another resin component may be an ionizing radiation-curable resin, a thermosetting resin, or a thermoplastic resin. Typical examples of the another resin component include an aliphatic (for example, polyolefin) resin and a urethane-based resin. In the case of using the another resin component, the kind and blending amount thereof are adjusted so that the refractive index modulation region is formed satisfactorily.

The resin component typically satisfies the following expression (5):

$$|n_P - n_A| < |n_P - n_B| \quad (5)$$

in the formula (5), $n_A$ represents a refractive index of a resin component of a matrix, $n_B$ represents a refractive index of an ultrafine particle component of the matrix, and $n_P$ represents a refractive index of a light diffusing fine particle. Further, the resin component may also satisfy the following expression (6).

$$|n_P - n_A| < |n_A - n_B| \quad (6)$$

The refractive index of the resin component is preferably 1.40 to 1.60.

The blending amount of the resin component is preferably 10 parts by weight to 80 parts by weight, more preferably 20 parts by weight to 65 parts by weight.

A-2-2. Ultrafine Particle Component

As described above, the ultrafine particle component 12 is formed of an inorganic compound. Preferred examples of the inorganic compound include a metal oxide and a metal fluoride. Specific examples of the metal oxide include zirconium oxide (zirconia) (refractive index: 2.19), aluminum oxide (refractive index: 1.56 to 2.62), titanium oxide (refractive index: 2.49 to 2.74), and silicon oxide (refractive index: 1.25 to 1.46). Specific example of the metal fluoride include magnesium fluoride (refractive index: 1.37) and calcium fluoride (refractive index: 1.40 to 1.43). These metal oxides and metal fluorides absorb less light and each have a refractive index which is difficult to be expressed with organic compounds such as the ionizing radiation-curable resin and the thermoplastic resin. Therefore, the weight concentration of the ultrafine particle component becomes relatively higher with increasing distance from the interface with each of the light diffusing fine particles, and thus, the metal oxides and metal fluorides can change the refractive index largely. By setting a refractive index difference between each of the light diffusing fine particles and the matrix to be large, a high haze can be realized even with a thin film, and the effect of preventing backscattering is large because the refractive index modulation region is formed. Zirconium oxide is a particularly preferred inorganic compound.

The ultrafine particle component may also satisfy the expressions (5) and (6). The refractive index of the ultrafine particle component is preferably 1.40 or less or 1.60 or more, more preferably 1.40 or less or 1.70 to 2.80, particularly preferably 1.40 or less or 2.00 to 2.80. When the refractive index is more than 1.40 or less than 1.60, the refractive index difference between each of the light diffusing fine particles and the matrix becomes insufficient, and in the case where the light diffusing element is used in a liquid crystal display device adopting a collimated backlight front diffusing system, light from a collimated backlight cannot be diffused enough, which may narrow a viewing angle.

It is preferred that an average primary particle diameter of the ultrafine particle component be small relative to the average thickness L of the refractive index modulation region. More specifically, the average primary particle diameter is preferably 1/50 to 1/2, more preferably 1/25 to 1/3 with respect to the average thickness L. When the average primary particle diameter is more than 1/2 with respect to the average thickness L, the refractive index in the refractive index modulation region does not change substantially continuously in some cases. As a result, backscattering may be increased and consequently, depolarization factor cannot be reduced in some cases. When the average primary particle diameter is less than 1/50, it may be difficult to form the refractive index modulation region in some cases. The ultrafine particle component may form a secondary aggregate, and the average particle diameter (average particle diameter of the aggregate) in that case is preferably 10 nm to 100 nm, more preferably 10 nm to 80 nm.

It is preferred that the ultrafine particle component have satisfactory dispersibility with the resin component. The term "satisfactory dispersibility" as used herein means that an applied film, which is obtained by applying an application liquid obtained by mixing the resin component, the ultrafine particle component (if required, a small amount of a UV initiator), and a volatile solvent, followed by removing the solvent by drying, is transparent.

Preferably, the ultrafine particle component is subjected to surface modification. By conducting surface modification, the ultrafine particle component can be dispersed satisfactorily in the resin component, and the refractive index modulation region can be formed satisfactorily. As surface modification means, any suitable means can be adopted as long as the effect of the present invention is obtained. Typically, the surface modification is conducted by applying a surface modifier onto the surface of an ultrafine particle component to form a surface modifier layer. Preferred specific examples of the surface modifier include coupling agents such as a silane-based coupling agent and a titanate-based coupling agent, and a surfactant such as a fatty acid-based surfactant. By using such surface modifier, the wettability between the resin component and the ultrafine particle component is enhanced, the interface between the resin component and the ultrafine particle component is stabilized, the ultrafine particle component is dispersed satisfactorily in the resin component, and the refractive index modulation region can be formed satisfactorily.

The blending amount of the ultrafine particle component is preferably 15 parts by weight to 80 parts by weight, more preferably 20 parts by weight to 70 parts by weight with respect to 100 parts by weight of the matrix.

A-3. Light Diffusing Fine Particles

As described above, the light diffusing fine particles 20 are formed of an amorphous material. The light diffusing fine particles 20 are preferably formed of any suitable material capable of forming the refractive index modulation region satisfactorily. More preferably, the light diffusing fine particles 20 are formed of a compound having equivalent or similar chemical structures and properties to those of the resin component of the matrix. For example, in the case where the ionizing radiation-curable resin that constructs the resin component of the matrix is an acrylate-based resin, it is preferred that the light diffusing fine particles be also constructed of the acrylate-based resin. More specifically, when the monomer component of the acrylate-based resin that constructs the resin component of the matrix is, for example, PETA, NPGDA, DPHA, DPPA, and/or TMPTA as described above, the acrylate-based resin that constructs the light-diffusing fine particles is preferably polymethyl methacrylate (PMMA), polymethyl acrylate (PMA), or a copolymer thereof, or a cross-linked product thereof. A copolymerizable component for each of PMMA and PMA is, for example, polyurethane, polystyrene (PS), or a melamine resin. Particularly preferably, the light diffusing fine particles are constructed of PMMA. This is because the relationship in refractive index and thermodynatic properties with respect to the resin component of the matrix and the ultrafine particle component is suitable. Further, preferably, the light diffusing fine particles have a cross-linked structure (three-dimensional network structure). By adjusting coarseness and fineness (cross-linking degree) of the cross-linked structure, a degree of freedom of polymer molecules forming the light diffusing fine particles on the surfaces thereof can be controlled, and hence, the dispersion state of the ultrafine particle component can be controlled, with a result that a refractive index modulation region having a desired refractive index gradient can be formed. For example, the swelling degree of each of the light diffusing fine particles at the time of the application of an application liquid described later with respect to the resin component precursor (which may contain a solvent) is preferably 100% to 200%. Here, the term "swelling degree" is an index of the cross-linking degree and refers to a ratio of an average particle diameter of each of the particles in a swollen state with respect to the average particle diameter of each of the particles before being swollen.

The average particle diameter of each of the light diffusing fine particles is preferably 1.0 μm to 5.0 μm, more preferably 1.0 μm to 4.0 μm. By setting the average particle diameter in such a range, the $T/d_P$ can be set in a desired range.

The standard deviation of a weight average particle diameter distribution of the light diffusing fine particles is preferably 1.0 μm or less, more preferably 0.5 μm or less. When the light diffusing fine particles each having a small particle diameter with respect to the weight average particle diameter are present in a large number, the light diffusibility may increase too much to suppress backscattering satisfactorily. When the light diffusing fine particles each having a large particle diameter with respect to the weight average particle diameter are present in a large number, a plurality of the light diffusing fine particles cannot be arranged in a thickness direction of the light diffusing element, and multiple diffusion may not be obtained. As a result, the light diffusibility may become insufficient.

As the shape of each of the light diffusing fine particles, any suitable shape can be adopted depending upon the purpose. Specific examples thereof include a spherical shape, a scale-like shape, a plate shape, an oval shape, and an amorphous shape. In most cases, spherical fine particles can be used as the light diffusing fine particles.

The light diffusing fine particles may also satisfy the expressions (5) and (6). The refractive index of the light diffusing fine particles is preferably 1.30 to 1.70, more preferably 1.40 to 1.60.

The blending amount of the light diffusing fine particles is preferably 10 parts by weight to 100 parts by weight, more preferably 10 parts by weight to 40 parts by weight, still more preferably 10 parts by weight to 35 parts by weight with respect to 100 parts by weight of the matrix. For example, by allowing the light diffusing fine particles having an average particle diameter in the above-mentioned preferred range to be contained in such blending amount, a light diffusing element which is made of a thin film and has very excellent light diffusibility can be obtained.

A-4. Manufacturing Method for Light Diffusing Element

A manufacturing method for a light diffusing element according to this embodiment includes the steps of: applying an application liquid, in which a resin component or a precursor thereof and an ultrafine particle component of a matrix, and light diffusing fine particles are dissolved or dispersed in a volatile solvent, onto a base material (defined as Step A); and drying the application liquid applied onto the base material (defined as Step B).

(Step A)

The resin component or precursor thereof, the ultrafine particle component, and the light diffusing fine particles are as described in the sections A-2-1, A-2-2, and A-3, respectively. Typically, the application liquid is a dispersion in which the ultrafine particle component and the light diffusing fine particles are dispersed in the precursor and the volatile solvent. As means for dispersing the ultrafine particle component and the light diffusing fine particles, any suitable means (for example, ultrasound treatment or dispersion treatment with a stirrer) can be adopted.

Any suitable solvent can be adopted as the volatile solvent as long as the solvent can dissolve or uniformly disperse each component described above. Specific examples of the volatile solvent include ethyl acetate, butyl acetate, isopropyl acetate, 2-butanone (methyl ethyl ketone), methyl isobutyl ketone, cyclopentanone, toluene, isopropyl alcohol, n-butanol, cyclopentane, and water.

The application liquid can further contain any suitable additive depending upon the purpose. For example, in order to disperse the ultrafine particle component satisfactorily, a dispersant can be preferably used. Other specific examples of the additive include a UV absorbing agent, a leveling agent, and an antifoaming agent.

The blending amount of each component in the application liquid is as described in the above sections A-2 to A-3. The solid content of the application liquid can be adjusted so as to be preferably about 10% by weight to 70% by weight. With such solid content, an application liquid having a viscosity that facilitates application can be obtained.

Any suitable film can adopted as the base material as long as the effects of the present invention can be provided. Specific examples thereof include a triacetyl cellulose (TAC) film, a polyethylene terephthalate (PET) film, a polypropylene (PP) film, a nylon film, an acrylic film, and a lactone-modified acrylic film. The base material may be subjected to surface modification such as adhesion enhancement treatment, or may include an additive such as a lubricant, an antistat, or a UV absorbing agent, as required. The base material may function as a protective layer in a polarizing plate with a light diffusing element described later.

Any suitable method using a coater can be adopted as a method of applying the application liquid onto the base material. Specific examples of the coater include a bar coater, a reverse coater, a kiss coater, a gravure coater, a die coater, and a comma coater.

(Step B)

As the method of drying the application liquid, any suitable method can be adopted. Specific examples thereof include natural drying, drying by heating, and drying under reduced pressure. Drying by heating is preferred. The heating temperature is, for example, 60° C. to 150° C., and the heating time is, for example, 30 seconds to 5 minutes.

(Step C)

The manufacturing method further includes preferably the step of polymerizing the precursor after the application step (Step C). As the polymerization method, any suitable method can be adopted depending upon the kind of the resin component (thus, the precursor thereof). For example, in the case where the resin component is an ionizing radiation-curable resin, the precursor is polymerized by emitting ionizing radiation. In the case of using UV light as the ionizing radiation, the integrated light quantity is preferably 50 mJ/cm$^2$ to 1,000 mJ/cm$^2$. The transmittance of the ionizing radiation with respect to the light diffusing fine particles is preferably 70% or more, more preferably 80% or more. Further, for example, in the case where the resin component is a thermosetting resin, the precursor is polymerized by heating. The heating temperature and the heating time can be set appropriately depending upon the kind of the resin component. Preferably, the polymerization is conducted by emitting ionizing radiation. The ionizing radiation can cure an applied film while keeping the refractive index modulation region satisfactorily, and hence, a light diffusing element with satisfactory diffusion property can be manufactured. By polymerizing the precursor, the matrix 10 having the refractive index modulation region 30 and the refractive index constant region is formed.

The polymerization step (Step C) may be conducted before the drying step (Step B) or after Step B.

As described above, the light diffusing element as illustrated in FIGS. 1A and 1B is formed on a base material.

It should be appreciated that the manufacturing method for a light diffusing element according to this embodiment can include, in addition to Steps A to C, any suitable steps, treatments and/or operations at any suitable times. The kind of such steps and the like and the time when such steps and the like are conducted can be set appropriately depending upon the purpose.

As described above, the light diffusing element as described in the sections A-1 to A-3 is formed on a base material.

A-5. Another Embodiment

Figure 6:
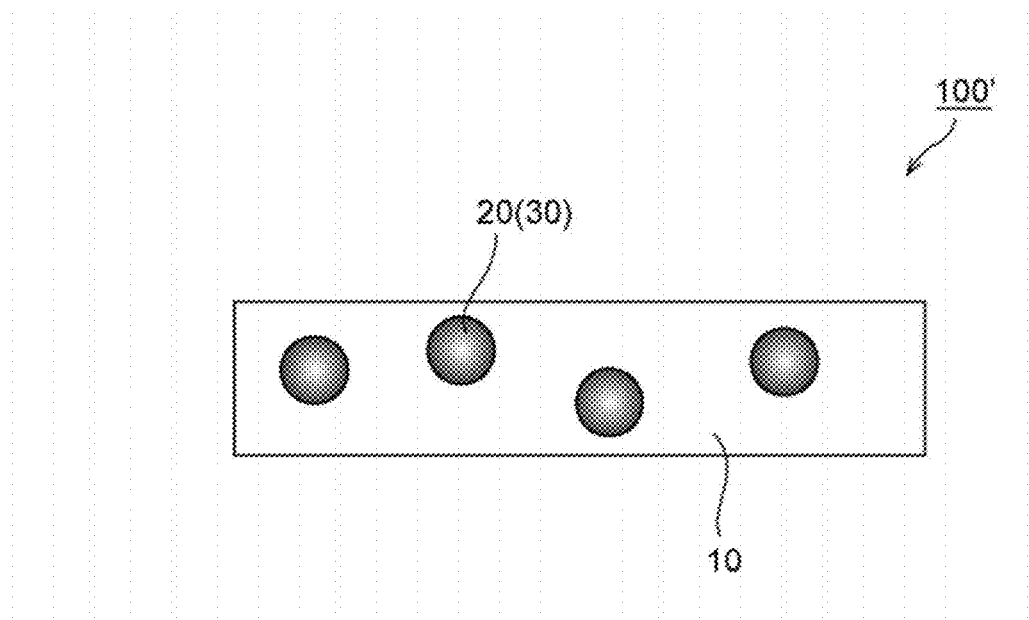
FIG. 6 is a schematic cross-sectional view of a light diffusing element according to another embodiment of the present invention.

FIG. 6 is a schematic cross-sectional view of a light diffusing element according to another embodiment of the present invention. A light diffusing element 100' of FIG. 6 includes a matrix 10 and light diffusing fine particles 20 dispersed in the matrix 10. The light diffusing fine particles 20 are refractive index gradient particles (for example, GRIN fine particles) the refractive index of which changes from a center portion to an outside, and each refractive index gradient portion forms a refractive index modulation region 30. Typically, the refractive index gradient particles are polymer particles formed of a center portion and a surface layer portion covering the center portion. A polymer forming such polymer particles is specifically, for example, a vinyl-based polymer, a (meth)acrylic polymer, or a styrene-based polymer. By selecting a polymer appropriately, a refractive index gradient can be controlled. The refractive index of each of such polymer particles can be changed in stages or continuously by, for example, using a plurality of monomers with different refractive indices, and changing monomer amounts along with the progression of copolymerization of the monomers. Such polymer particles and a manufacturing method therefor are described in detail, for example, in JP 2006-227279 A, the description of which is incorporated herein by reference. For example, the matrix 10 can be formed of a resin as described in the section A-2-1 regarding a resin component in an embodiment using an ultrafine particle component. The matrix 10 may or may not contain an ultrafine particle component. In this embodiment, the center portion of the light diffusing fine particle 20 forms the first region, and the matrix 10 forms the second region. In the refractive index modulation region 30, preferably, the refractive index changes substantially continuously.

This embodiment has been described briefly only with respect to a characteristic portion of its structure. The entire characteristics of the light diffusing element according to this embodiment are as described above regarding the embodiment using a matrix including a resin component and an ultrafine particle component.

The light diffusing element of the present invention may be peeled from a base material to be used as a single member or may be used as a light diffusing element with a base material. Alternatively, the light diffusing element may be used as a composite member (for example, a polarizing plate with a light diffusing element) by transferring the light diffusing element from a base material to a polarizing plate or the like, or may be used as a composite member (for example, a polarizing plate with a light diffusing element) by attaching the light diffusing element to a polarizing plate or the like together with a base material. In the case of using the light diffusing element as a composite member (for example, a polarizing plate with a light diffusing element) by attaching the light diffusing element to a polarizing plate or the like together with a base material, the base material can function as a protective layer of the polarizing plate.

The particular embodiments of the present invention have been described hereinbefore. It should be noted that the present invention is not limited to those embodiments, and the present invention includes any other light diffusing film including: a first region having a first refractive index; a substantially spherical shell-shaped refractive index modulation region surrounding the first region; and a second region having a second refractive index, the region being positioned on a side of the refractive index modulation region opposite to the first region, in which the light diffusing film satisfies the haze in above-mentioned range and the depolarization factor in above-mentioned range.

B. Polarizing Plate with Light Diffusing Element

B-1. Entire Construction of Polarizing Plate with Light Diffusing Element

Figure 7A:
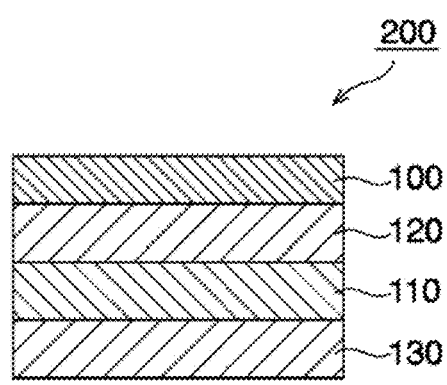
FIG. 7A is a schematic cross-sectional view of a polarizing plate with a light diffusing element according to one embodiment of the present invention.
Figure 7B:
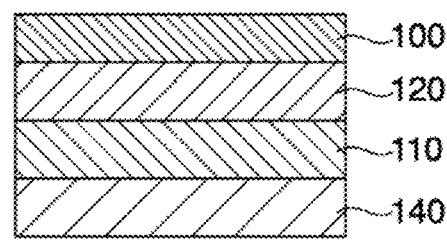
FIG. 7B is a schematic cross-sectional view of a polarizing plate with a light diffusing element according to another embodiment of the present invention.

FIG. 7A is a schematic cross-sectional view of a polarizing plate with a light diffusing element according to one embodiment of the present invention. A polarizing plate with a light diffusing element 200 in the figure includes a light diffusing element 100 and a polarizer 110. The light diffusing element 100 is the light diffusing element of the present invention described in the sections A-1 to A-5. The light diffusing element 100 is disposed so as to be placed at a position closest to a viewer side when the polarizing plate with a light diffusing element is placed on the viewer side of the liquid crystal display device. In one embodiment, a low reflective layer or a reflection preventing treatment layer (anti-reflection treatment layer) is placed on the viewer side of the light diffusing element 100 (not shown). In the example illustrated in the figure, the polarizing plate with a light diffusing element 200 includes protective layers 120 and 130 on both sides of the polarizer. The light diffusing element, the polarizer and the protective layers are attached to each other via any suitable adhesive layer or pressure-sensitive adhesive layer. At least one of the protective layers 120 and 130 may be omitted depending upon the purpose, the construction of the polarizing plate, and the construction of the liquid crystal display device. For example, in the case where a base material used for forming the light diffusing element can function as a protective layer, the protective layer 120 may be omitted. FIG. 7B is a schematic cross-sectional view of a polarizing plate with a light diffusing element according to another embodiment of the present invention. In this embodiment, a retardation layer 140 is placed instead of the protective layer 130, and the retardation layer 140 also serves as a protective layer. The optical properties (for example, refractive index ellipsoid, in-plane retardation, thickness direction retardation) of the retardation layer can be set appropriately in accordance with the purpose. When a slow axis appears in the retardation layer 140, the slow axis and the absorption axis of the polarizer 110 are substantially perpendicular or parallel to each other in one embodiment (for example, a viewer-side polarizing plate of a collimated backlight front diffusing system), and define an angle of 15° to 75°, preferably 40° to 50° in another embodiment (for example, a 3D polarizing plate).

Figure 7C:
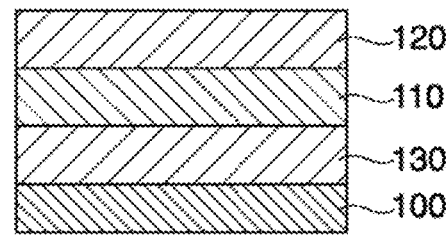
FIG. 7C is a schematic cross-sectional view of a polarizing plate with a light diffusing element according to still another embodiment of the present invention.
Figure 7D:
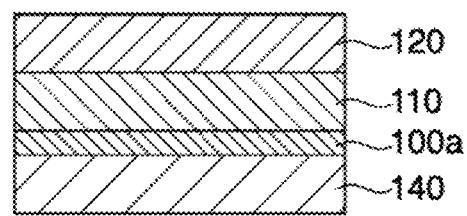
FIG. 7D is a schematic cross-sectional view of a polarizing plate with a light diffusing element according to still another embodiment of the present invention.
Figure 7E:
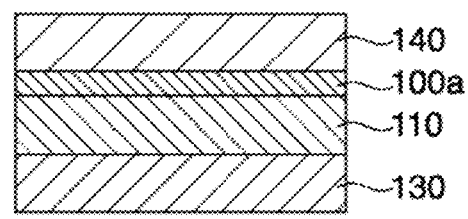
FIG. 7E is a schematic cross-sectional view of a polarizing plate with a light diffusing element according to still another embodiment of the present invention.

FIG. 7C is a schematic cross-sectional view of a polarizing plate with a light diffusing element according to still another embodiment of the present invention. In this embodiment, the light diffusing element 100 is placed so as to be positioned on a liquid crystal cell side (inner side) when the polarizing plate with a light diffusing element is placed on a viewer side of the liquid crystal display device. FIG. 7D is a schematic cross-sectional view of a polarizing plate with a light diffusing element according to still another embodiment of the present invention. In this embodiment, a light diffusing element is attached to a polarizer, and thereafter, a base material is peeled to achieve a reduction in thickness. Further, the retardation layer 140 is placed instead of the protective layer 130. It should be noted that, for convenience sake, the light diffusing element from which the base material has been peeled is used as a light diffusing layer 100a. FIG. 7E is a schematic cross-sectional view of a polarizing plate with a light diffusing element according to still another embodiment of the present invention. In this embodiment, the retardation layer 140 is placed so as to be positioned closest to a viewer side. The polarizing plate with a light diffusing element according to this embodiment can be used particularly suitably as a 3D polarizing plate.

The embodiments illustrated in FIGS. 7A to 7E can be combined appropriately in accordance with the purpose. Further, depending on the purpose, the arrangement order of the respective layers in the polarizing plate with a light diffusing element may be changed, or a particular layer may be added or omitted. For example, the protective layer 130 may be omitted in the embodiment of FIG. 7C, the light diffusing layer 100a may be exchanged for the retardation layer 140 or the retardation layer 140 may be omitted in the embodiment of FIG. 7D, and the light diffusing layer 100a may be exchanged for the retardation layer 140 in the embodiment of FIG. 7E. Further, for example, a plurality of retardation layers may be arranged.

The polarizing plate with a light diffusing element of the present invention can be used suitably as, for example, a viewer-side polarizing plate of a collimated backlight front diffusing system, a polarizing plate for a reflection type liquid crystal display device, and a 3D polarizing plate (linearly polarized light output polarizing plate or circularly polarized light output polarizing plate).

B-2. Polarizer

Any appropriate polarizer can be adopted as the polarizer depending on purposes. Examples thereof include: a film prepared by adsorbing a dichromatic substance such as iodine or a dichromatic dye on a hydrophilic polymer film such as a polyvinyl alcohol-based film, a partially formalized polyvinyl alcohol-based film, or a partially saponified ethylene/vinyl acetate copolymer-based film and uniaxially stretching the film; and a polyene-based aligned film such as a dehydrated polyvinyl alcohol film or a dehydrochlorinated polyvinyl chloride film. Of those, a polarizer prepared by adsorbing a dichromatic substance such as iodine on a polyvinyl alcohol-based film and uniaxially stretching the film is particularly preferred because of high polarized dichromaticity. The thickness of the polarizer is not particularly limited, but is generally about 1 to 80 µm.

The polarizer prepared by adsorbing iodine on a polyvinyl alcohol-based film and uniaxially stretching the film may be produced by, for example: immersing a polyvinyl alcohol-based film in an aqueous solution of iodine for coloring; and stretching the film to a 3 to 7 times length of the original length. The aqueous solution may contain boric acid, zinc sulfate, zinc chloride, or the like if necessary, or the polyvinyl alcohol-based film may be immersed in an aqueous solution of potassium iodide or the like. Further, the polyvinyl alcohol-based film may be immersed and washed in water before coloring if necessary.

Washing the polyvinyl alcohol-based film with water not only allows removal of contamination on the surface of the polyvinyl alcohol-based film or washing away of an anti-blocking agent, but also provides an effect of preventing unevenness such as uneven coloring by swelling the polyvinyl alcohol-based film. The stretching of the film may be performed after coloring of the film with iodine, performed during coloring of the film, or performed followed by coloring of the film with iodine. The stretching may be performed in an aqueous solution of boric acid, potassium iodide, or the like, or in a water bath.

B-3. Protective Layer

The protective layers 120 and 130 are each formed of any appropriate film which can be used as a protective layer for a polarizing plate. As a material used as a main component of the film, there are specifically exemplified a cellulose-based resin such as triacetylcellulose (TAC), and transparent resins such as a polyester-based resin, a polyvinyl alcohol-based resin, a polycarbonate-based resin, a polyamide-based resin, a polyimide-based resin, a polyether sulfone-based resin, a polysulfone-based resin, a polystyrene-based resin, a polynorbornene-based resin, a polyolefin-based resin, a (meth)acrylic resin, and an acetate-based resin. Further, there are exemplified a (meth)acrylic, urethane-based, (meth)acrylic urethane-based, epoxy-based, or silicone-based thermosetting resin or UV-curable resin. Still further, there are exemplified a glassy polymer such as a siloxane-based polymer. In addition, a polymer film described in JP 2001-343529 A (WO 01/37007) may also be used. As the film material, for example, there may be used a resin composition containing a thermoplastic resin having a substituted or unsubstituted imide group on a side chain, and a thermoplastic resin having a substituted or unsubstituted phenyl group and a nitrile group on a side chain. An example thereof is a resin composition containing an alternate copolymer of isobutene and N-methylmaleimide, and an acrylonitrile/styrene copolymer. The polymer film may be an extruded product of the resin composition, for example.

The protective layer (internal protective layer) 130 preferably has optical isotropy. Specifically, a thickness direction retardation Rth(550) of the internal protective layer is preferably in a range of −20 nm to +20 nm, more preferably in a range of −10 nm to +10 nm, particularly preferably in a range of −6 nm to +6 nm, most preferably in a range of −3 nm to +3 nm. An in-plane retardation Re(550) of the internal protective layer is preferably 0 nm or more and 10 nm or less, more preferably 0 nm or more and 6 nm or less, particularly preferably 0 nm or more and 3 nm or less. The film for forming the protective layer having the optical isotropy is described in detail in JP 2008-180961 A and the description is incorporated herein by reference.

B-4. Manufacturing Method for Polarizing Plate with Light Diffusing Element

Figure 8:
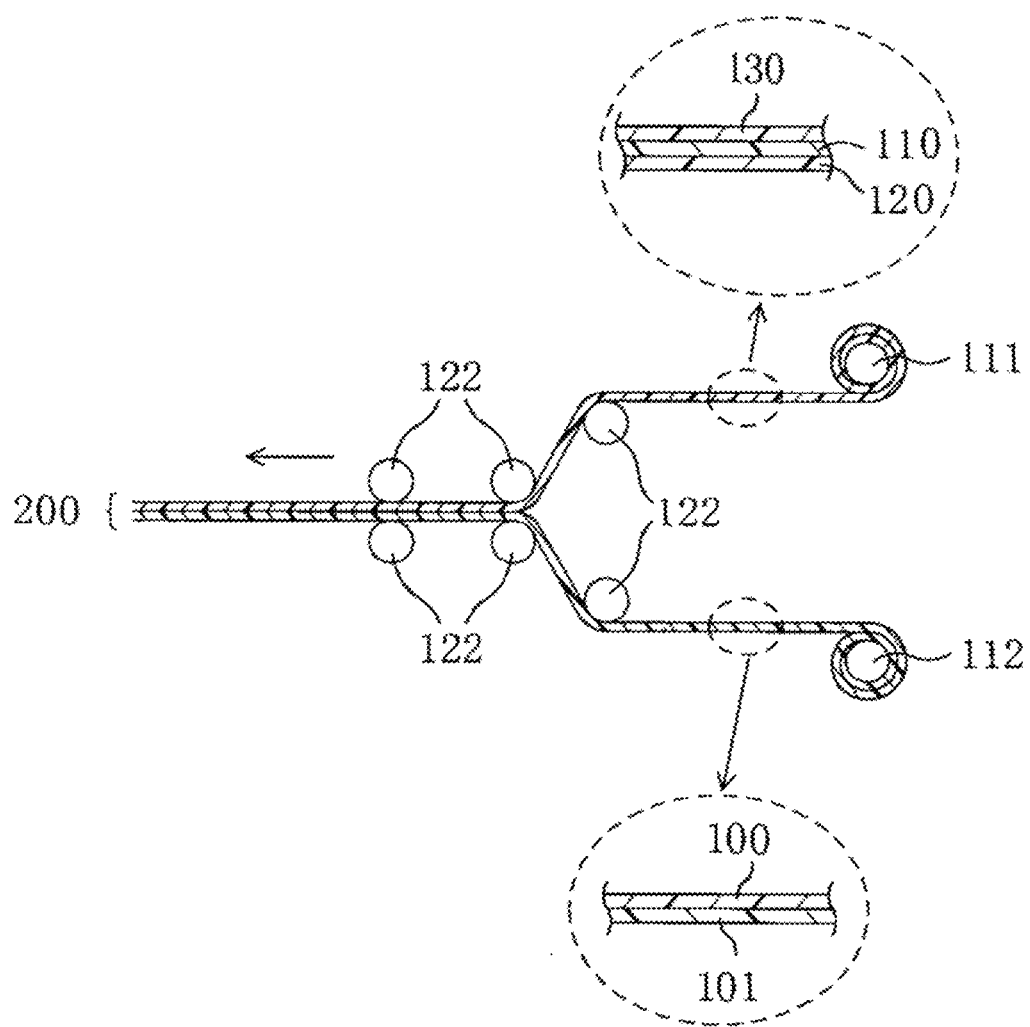
FIG. 8 is a schematic view illustrating an example of a manufacturing method for a polarizing plate with a light diffusing element of the present invention.

Referring to FIG. 8, an example of a manufacturing method for a polarizing plate with a light diffusing element of the present invention is described briefly. In FIG. 8, reference symbols 111 and 112 respectively denote rolls for winding a polarizing plate and a laminate of a light diffusing element/a base material, and 122 denotes conveyance rolls. In the illustrated example, a polarizing plate (protective layer 130/polarizer 110/protective layer 120) and a laminate of a light diffusing element 100/a base material 101 are fed out in an arrow direction and attached to each other while their respective longitudinal directions are aligned. At this time, the polarizing plate and the laminate are attached to each other so that the light diffusing element 100 and the protective layer 120 of the polarizing plate are adjacent to each other. After that, the base material 101 is peeled off if necessary, and thereby, a polarizing plate with a light diffusing element 200 as illustrated in FIG. 7A can be obtained. Although not shown, for example, the polarizing plate (protective layer 130/polarizer 110) and the laminate of the light diffusing element 100/base material 101 can be attached to each other so that the base material 101 and the polarizer 110 are adjacent to each other to produce a polarizing plate with a light diffusing element in which the base material functions as a protective layer. Thus, according to an embodiment of the present invention, so-called roll-to-roll can be adopted, and hence, a polarizing plate with a light diffusing element can be produced at very high production efficiency. Further, the roll-to-roll process can be performed continuously from the production process of the light diffusing element described in the section A-4, and hence, the production efficiency of the polarizing plate with a light diffusing element can be further enhanced by adopting such procedure.

EXAMPLES

Hereinafter, the present invention is specifically described by way of examples. However, the present invention is not limited by these examples. Evaluation methods in the examples are as follows. In addition, unless otherwise stated, "part(s)" and "%" in the examples are by weight.

(1) Thickness of Light Diffusing Element

The total thickness of a base material and a light diffusing element was measured with a microgauge-type thickness meter (manufactured by Mitutoyo Corporation), and the thickness of the base material was subtracted from the total thickness to calculate the thickness of the light diffusing element.

(2) Thickness of Refractive Index Modulation Region

A laminate of the light diffusing element and the base material obtained in each of the examples and comparative examples was sliced so as to have a thickness of 0.1 μm with a microtome while being cooled with liquid nitrogen to obtain a measurement sample. The state of fine particles in a light diffusing element portion of the measurement sample and the state of an interface between the fine particles and the matrix were observed with a transmission electron microscope (TEM). A portion in which the interface between the light diffusing fine particles and the matrix was unclear was defined as "refractive index modulation region". In the case where an interface between the light diffusing fine particle and the matrix was clear, it was recognized that no refractive index modulation region was formed.

(3) Haze

Measurement was performed with a haze meter ("HN-150" (trade name) manufactured by Murakami Color Research Laboratory Co., Ltd.) in accordance with a method specified in JIS 7136.

(4) Light Diffusion Half-Value Angle

Figure 9:
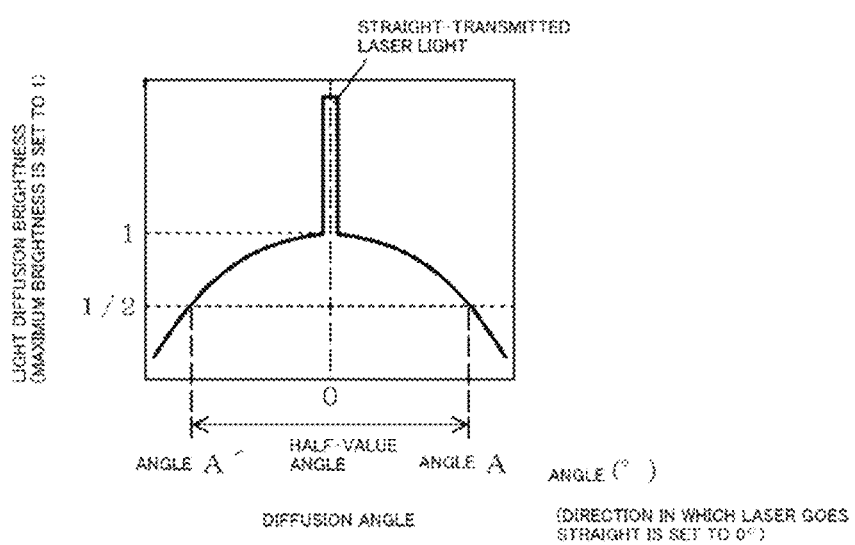
FIG. 9 is a schematic view for illustrating a method of calculating a light diffusion half-value angle.

The light diffusing element was irradiated with laser light from its front surface. The diffusion brightness of diffused light at a diffusion angle was measured every 1° by a goniophotometer. As shown in FIG. 9, diffusion angles corresponding to a half of a maximum value of diffusion brightness of light beams other than a straight-transmitted laser beam were measured on both sides of a diffusion profile. A value obtained by adding the angles measured on both sides ("(angle A)+(angle A')" in FIG. 9) was defined as a light diffusion half-value angle.

(5) Backscattering Ratio

The laminate of the light diffusing element and the base material obtained in each of the examples and comparative examples was attached onto a black acrylic plate ("SUMIPEX" (trade name) (trademark), thickness: 2 mm, manufactured by Sumitomo Chemical Co., Ltd.) via a transparent pressure-sensitive adhesive to obtain a measurement sample. The integrated reflectance of the measurement sample was measured with a spectrophotometer ("U4100" (trade name) manufactured by Hitachi Ltd.). On the other hand, a laminate of a base material and a transparent applied layer was produced as a control sample, using an application liquid in which fine particles were removed from an application liquid for the light diffusing element and the integrated reflectance (i.e., surface reflectance) thereof was measured in the same way as described above. The integrated reflectance (surface reflectance) of the control sample was subtracted from the integrated reflectance of the measurement sample to calculate a backscattering ratio of the light diffusing element.

(6) Depolarization Factor

Orthogonal transmitted light brightness $L_C$ and parallel transmitted light brightness $L_P$ when two identical polarizing plates were laminated were measured through use of a depolarization measurement device (ConoScope (trade name) manufactured by Autronic-MELCHERS GmbH), and a polarization contrast CR2 was calculated from $L_P/L_C$. The polarization contrast CR2 was 9,200. It should be noted that the orthogonal transmitted light brightness $L_C$ is front brightness measured when the polarizing plates are laminated so that the absorption axes are perpendicular to each other, and the parallel transmitted light brightness $L_P$ is front brightness measured when the polarizing plates are laminated so that the absorption axes are parallel to each other. Next, the light diffusing element obtained in any of Examples and Comparative Examples was sandwiched between the two identical polarizing plates, and the polarizing plates were arranged so that the absorption axes were perpendicular to each other with the light diffusing element sandwiched between the polarizing plates. The light diffusing element was rotated while the laminated polarizing plates were irradiated with white collimated light from normal direction, the light diffusing element was fixed at an angle where an amount of transmitted light became smallest, and front brightness (orthogonal transmitted light brightness $L_C$) was measured. Further, the positional relationship of the polarizing plates was changed so that the absorption axes were parallel to each other, and front brightness (parallel transmitted light brightness $L_P$ was measured similarly. A polarization contrast CR1 was calculated from $L_P/L_C$. Finally, the depolarization factor was determined by the following equation (1).

$$\text{Depolarization factor } X (\%) = \{(1/CR1) - (1/CR2)\} \times 100 \quad (1)$$

Example 1

Production of Light Diffusing Element

To 100 parts of a hard coat resin ("OpstarKZ6661" (trade name) (containing MEK/MIBK) manufactured by JSR Corporation) containing 62% of zirconia nano particles (average particle diameter: 60 nm, average primary particle diameter: 10 nm, refractive index: 2.19) as an ultrafine particle component, 11 parts of a 50% methyl ethyl ketone (MEK) solution of pentaerythritol triacrylate ("Biscoat #300" (trade name), refractive index: 1.52, manufactured by Osaka Organic Chemical Industry Ltd.) as a precursor of a resin component, 0.5 part of a photopolymerization initiator ("Irgacure 907" (trade name), manufactured by BASF Japan Ltd.), 0.5 part of a leveling agent ("GRANDIC PC 4100" (trade name), manufactured by DIC Corporation), and 15 parts of polymethyl methacrylate (PMMA) fine particles ("XX-131AA" (trade name), average particle diameter: 2.5 μm, refractive index: 1.495, manufactured by Sekisui Plastics Co., Ltd.) as light diffusing fine particles were added. The mixture was subjected to dispersion treatment by stirring with a stirring machine ("DESPA" (trade name), manufactured by ASADA IRON WORKS. CO., LTD.) for 30 minutes to prepare an application liquid in which the above-mentioned respective components were dispersed uniformly. The solid content of the application liquid was 55%. The application liquid was applied onto a base material made of a TAC film ("KC4UY" (trade name), thickness: 40 μm, manufactured by KONICA MINOLTA OPTO, INC.) with a bar coater, dried at 100° C. for 1 minute, and irradiated with UV light with an integrated light quantity of 300 mJ/cm² to obtain a light diffusing element with a thickness of 7 μm. A difference between an average refractive index $n_M$ of the matrix and a refractive index $n_P$ of the light diffusing fine particle in the light diffusing element thus obtained was 0.12 ($n_M > n_P$). The obtained light diffusing element was subjected to the above-mentioned evaluations (1) to (6). Table 1 shows the results together with the results of Example 2 and Comparative Examples 1 to 3 described later.

TABLE 1

|  | Example 1 | Example 2 | Comparative Example 1 | Comparative Example 2 | Comparative Example 3 |
|---|---|---|---|---|---|
| Thickness (μm) | 7 | 11.5 | 19 | 25 | 30 |
| Refractive index modulation region | Present | Present | Absent | Absent | Absent |
| Concentration of ultrafine particle component (% by weight) | 51 | 51 | 0 | 0 | 0 |
| Haze (%) | 96.0 | 98.0 | 98.3 | 96.0 | 98.3 |
| Light diffusion half-value angle (°) | 45 | 60 | 65 | 48 | 65 |
| Back-scattering ratio (%) | 0.2 | 0.5 | 1.2 | 2.5 | 3.5 |
| Polarization contrast CR1 | 1,800 | 1,050 | 320 | 450 | 360 |
| Polarization contrast CR2 | 9,200 | 9,200 | 9,200 | 9,200 | 9,200 |
| Depolarization factor (%) | 0.045 | 0.084 | 0.302 | 0.211 | 0.267 |

Example 2

Production of Light Diffusing Element

A light diffusing element having a thickness of 11.5 μm was obtained in the same manner as in Example 1 except that the application thickness of the application liquid was changed. The thus obtained light diffusing element was subjected to the same evaluations as those of Example 1. Table 1 above shows the results.

Comparative Example 1

85 parts of a polystyrene resin (Polystyrene Standards (trade name), molecular weight: 30,000, manufactured by Pressure Chemical Company), 15 parts of silicone resin fine particles ("Tospal 120" (trade name), average particle diameter: 2.0 μm, refractive index: 1.43, manufactured by Momentive Performance Materials Inc.), and 500 parts of ethyl acetate were mixed, and the mixture was stirred for 1 day to prepare an application liquid. The application liquid was applied onto a TAC film ("KC4UY" (trade name), thickness: 40 μm, manufactured by KONICA MINOLTA OPTO, INC.) through use of a wire bar and dried at 80° C. for 5 minutes to obtain a light diffusing element having a thickness of 19 μm. The thus obtained light diffusing element was subjected to the same evaluations as those of Example 1. Table 1 above shows the results.

Comparative Example 2

25 parts of a fluorene-based acrylate monomer ("Ogsol EA-2000" (trade name), solid content 100%, manufactured by Osaka Gas Chemical Co., Ltd.), 2.5 parts of PMMA fine particles ("Art Pearl J-4P" (trade name), average particle diameter: 2.1 μm, refractive index: 1.495, manufactured by Negami Chemical Industrial Co., Ltd.), 0.07 part of a photopolymerization initiator ("Irgacure 907" (trade name) manufactured by BASF Japan Ltd.), and 0.6 part of a leveling agent ("GRADIC PC 4100" (trade name) manufactured by DIC Corporation) were mixed. The mixture was subjected to an ultrasonic treatment for 5 minutes to prepare an application liquid in which the respective components were dispersed uniformly. The application liquid was applied onto a base material made of a TAC film ("KC4UY" (trade name), thickness: 40 μm, manufactured by KONICA MINOLTA OPTO, INC.) through use of a bar coater and dried at 100° C. for 1 minute. After that, the resultant was irradiated with UV light with an integrated light quantity of 300 mJ/cm² to obtain a light diffusing element having a thickness of 25 μm. The thus obtained light diffusing element was subjected to the evaluations (1) to (6). Table 1 above shows the results.

Comparative Example 3

A light diffusing element having a thickness of 30 μm was obtained in the same manner as in Example 1 except that the application thickness of the application liquid was changed. The thus obtained light diffusing element was subjected to the same evaluations as those of Example 1. Table 1 above shows the results.

<Evaluation>

As is apparent from Table 1, each of the light diffusing elements of Examples 1 and 2 containing an inorganic ultrafine particle component in a matrix at a high concentration includes a refractive index modulation region formed in the vicinity of an interface between the matrix and each of the light diffusing fine particles and has a very small depolarization factor, a high haze value, a large light diffusion half-value angle (high light diffusibility), and a small backscattering ratio. On the other hand, each of the light diffusing elements of Comparative Examples 1 to 3 not containing an inorganic ultrafine particle component has a large backscattering ratio and a large depolarization factor. It should be noted that, when each of the light diffusing elements of Comparative Examples 1 to 3 was produced so as to have a thickness similar to that of each of the light diffusing elements of Examples, it was confirmed that the light diffusibility was degraded remarkably.

INDUSTRIAL APPLICABILITY

The light diffusing element and polarizing plate with a light diffusing element of the present invention can be used suitably in a viewer-side member of a liquid crystal display device (for example, a liquid crystal display device of a collimated backlight front diffusing system, a reflection type liquid crystal display device, a 3D liquid crystal display device), a member for a backlight of a liquid crystal display device, a diffusing member for illumination equipment (for example, an organic EL, LED), 3D polarized glasses, and the like.

REFERENCE SIGNS LIST 10 matrix
11 resin component
12 ultrafine particle component
20 light diffusing fine particle
30 refractive index modulation region
100 light diffusing element
110 polarizer
120 protective layer
130 protective layer
140 retardation layer
200 polarizing plate with light diffusing element

The invention claimed is:

1. A light diffusing element, comprising:
   a first region having a first refractive index;
   a refractive index modulation region having a substantially spherical shell shape, which surrounds the first region; and
   a second region having a second refractive index, which is positioned on a side of the refractive index modulation region opposite to the first region,
   wherein the light diffusing element has a haze of 90% to 99.9% and a depolarization factor of up to 0.2%.

2. The light diffusing element according to claim 1, wherein the light diffusing element has a light diffusion half-value angle of 10° to 90°.

3. The light diffusing element according to claim 1, wherein the light diffusing element has a backscattering ratio of 1% or less.

4. The light diffusing element according to claim 1, wherein the light diffusing element has an in-plane retardation Re of 5 nm or less.

5. The light diffusing element according to claim 1, wherein a ratio $T/d_P$ between a thickness T of the light diffusing element and an average particle diameter $d_P$ of the light diffusing fine particles is 10 or less.

6. A polarizing plate with a light diffusing element, comprising:
   the light diffusing element according to claim 1; and
   a polarizer.

7. The light diffusing element according to claim 1, wherein the first refractive index is different from the second refractive index.

8. The light diffusing element according to claim 1, wherein the refractive index modulation region has a refractive index that changes in a substantially continuous manner; and
   wherein the refractive index gap is up to 0.05 for the interface between the first region and the refractive index modulation region; for the interface between the second region and the refractive index modulation region, or both.

9. The light diffusing element according to claim 1, wherein the haze is 95% to 99.9%.

10. The light diffusing element according to claim 1, wherein the light diffusing element satisfies expression (4):

$$0.01 \leq L/r_p \leq 0.2$$

wherein $r_p$ is the radius (nm) of the light diffusing particle and L is the average thickness of the refractive index modulation region.

11. The light diffusing element according to claim 1, wherein the light diffusing element has a thickness of 4 μm to 50 82 m.

12. The light diffusing element according to claim 1,
   wherein the second region comprises a matrix containing an inorganic ultrafine particle component and a resin component; and
   wherein the first region consists of amorphous light diffusing fine particles dispersed in the matrix,
   wherein the refractive index modulation region is formed in a vicinity of an interface between the matrix and the amorphous light diffusing fine particle by a substantial gradient of a dispersion concentration of the inorganic ultrafine particle component in the matrix.

13. A light diffusing element, comprising:
a matrix containing an inorganic ultrafine particle component and a resin component; and
amorphous light diffusing fine particles dispersed in the matrix,
wherein a refractive index modulation region is formed in a vicinity of an interface between the matrix and the amorphous light diffusing fine particle by a substantial gradient of a dispersion concentration of the inorganic ultrafine particle component in the matrix;
wherein the light diffusing element has a haze of 90% to 99.9% and a depolarization factor of up to 0.2%.

14. The light diffusing element according to claim 13, wherein the matrix contains the inorganic ultrafine particle component in an amount of 40% by weight or more.

15. The light diffusing element according to claim 13, wherein the inorganic ultrafine particle component has an average primary particle diameter of 5 nm to 100 nm.

16. The light diffusing element according to claim 13, wherein the amorphous light diffusing fine particles consist of an organic compound.

17. The light diffusing element according to claim 13, wherein the inorganic ultrafine particle compound has a refractive index that is different from the amorphous light diffusing fine particles.

18. The light diffusing element according to claim 13, wherein the light diffusing element satisfies a ratio T/dp of 10 or less;
wherein T is the thickness of the light diffusing element and dp is an average particle diameter of the amorphous light diffusing fine particles.

19. The light diffusing element according to claim 13, wherein the resin is an ionizing radiation-curable resin.

20. The light diffusing element according to claim 13, wherein the resin has a refractive index of 1.40 to 1.60.

21. The light diffusing element according to claim 13, wherein the inorganic ultrafine particle has a refractive index of up to 1.40 or 1.60 or more.

22. The light diffusing element according to claim 13, wherein the amorphous light diffusing fine particles have an average primary particle diameter of 1.0 μm to 5.0 μm.

23. The light diffusing element according to claim 13, wherein the amorphous light diffusing fine particles have a standard deviation of a weight average particle diameter distribution of up to 1.0 μm.

24. The light diffusing element according to claim 13, wherein the amorphous light diffusing fine particles have a refractive index of 1.40 to 1.60.

* * * * *